(12) United States Patent
Trevillyan et al.

(10) Patent No.: US 7,320,479 B2
(45) Date of Patent: *Jan. 22, 2008

(54) HYBRID INFLATOR

(75) Inventors: Dennis A. Trevillyan, Plant City, FL (US); Michael E. Kelley, Valrico, FL (US); Michael F. Mulville, Bartow, FL (US); Carter L. Burroughs, Lakeland, FL (US); John H. Adams, Lakeland, FL (US); Edward R. Stembler, Tampa, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 240 days.

This patent is subject to a terminal disclaimer.

(21) Appl. No.: 11/241,222

(22) Filed: Oct. 3, 2005

(65) Prior Publication Data

US 2007/0075535 A1    Apr. 5, 2007

(51) Int. Cl.
*B60R 21/26* (2006.01)
(52) U.S. Cl. ....................... 280/736; 280/737
(58) Field of Classification Search ............... 280/741, 280/737, 736, 742
See application file for complete search history.

(56) References Cited

U.S. PATENT DOCUMENTS

| 5,553,889 | A |   | 9/1996  | Hamilton et al. |
| 5,564,743 | A | * | 10/1996 | Marchant ............... 280/741 |
| 5,630,619 | A |   | 5/1997  | Buchanan |
| 5,660,412 | A |   | 8/1997  | Renfroe et al. |
| 5,664,803 | A |   | 9/1997  | Skaanberg |
| 5,794,973 | A | * | 8/1998  | O'Loughlin et al. ......... 280/737 |
| 6,095,556 | A | * | 8/2000  | Bailey et al. ............... 280/737 |
| 6,142,514 | A |   | 11/2000 | Yamato et al. |
| 6,189,922 | B1 | * | 2/2001  | Parks et al. ................. 280/735 |
| 6,237,950 | B1 |   | 5/2001  | Cook et al. |
| 6,253,683 | B1 |   | 7/2001  | Fukabori |
| 6,488,310 | B1 |   | 12/2002 | Ryobo et al. |
| 6,793,244 | B1 |   | 9/2004  | Katsuda et al. |
| 6,976,704 | B2 | * | 12/2005 | Lewis et al. ................. 280/741 |
| 2003/0001370 | A1 |   | 1/2003 | Ryobo et al. |
| 2004/0100079 | A1 |   | 5/2004 | Yamazaki et al. |
| 2006/0091660 | A1 | * | 5/2006 | Lang et al. .................. 280/737 |
| 2007/0075534 | A1 | * | 4/2007 | Kelley et al. ............... 280/736 |
| 2007/0075536 | A1 | * | 4/2007 | Kelley et al. ............... 280/737 |
| 2007/0085309 | A1 | * | 4/2007 | Kelley et al. ............... 280/736 |

FOREIGN PATENT DOCUMENTS

| EP | 0790157 A2 | 8/1997 |
| EP | 1371526 A2 | 12/2003 |
| EP | 1 405 775 A1 | 4/2004 |
| WO | 2000/32448 A | 6/2000 |

* cited by examiner

*Primary Examiner*—Paul N. Dickson
*Assistant Examiner*—Drew J. Brown
(74) *Attorney, Agent, or Firm*—Lonnie Drayer

(57) ABSTRACT

A hybrid inflator for inflating an airbag system has one or more heater assemblies with an enhancer charge contained in the heater with bypass ports or openings in direct communication with the inert gas. Upon ignition a portion of the enhancer charge bypasses the heater gas generant charge to pre-heat the inert gas prior to or simultaneously with a remaining portion of the enhancer charge igniting the heater gas generant charge.

12 Claims, 4 Drawing Sheets

HYBRID INFLATOR

FIELD OF THE INVENTION

This invention relates to a hybrid type airbag inflator.

BACKGROUND OF THE INVENTION

Hybrid type inflators used for inflating airbag systems are filled with an inert gas in the inflator chamber that is heated by a pyrotechnic within a heater structure. This pyrotechnic is activated generally by firing a squib or igniter means for initiating a rapid burning of the generant within a heater system; this generant heats the inert gas such that sufficient pressure can be achieved prior to being released through the airbag system thereby inflating it.

U.S. Pat. No. 5,660,412 discloses the use of a primary heater and a bypass heater to achieve more rapid heating of the pressurized fluid in a cylindrical hybrid gas generator. The patent teaches a first pyrotechnic material as a primary source of heating and a second pyrotechnic material having a faster rate of gas generation wherein portions of these products of combustion directly heat the inflation gas using a single initiator.

More typically multi stage hybrid inflators utilize two squibs or initiators to separately ignite two separate generants or pyrotechnic materials. Hybrid inflators of this type are disclosed in US 2004/0100079 A1, U.S. Pat. No. 6,793,244 B1, US 2003/0001370 A1 and U.S. Pat. No. 6,488,310 B1. In each of these prior art references the gas generant is contained in a heater element that can be activated in multiple stages by using two separate squibs or initiators. These firing sequences are made possible by time delay such that when one activates the initiators they can be activated singularly or in parallel or sequentially.

The use of two separate heaters in opposite ends of the cylindrical inflator with the central exhaust has been taught in U.S. Pat. No. 6,253,683 B1 and EP 1 405 775. These early prior art cylindrical inflators with a central exhaust did not employ bypass enhancer heaters to pre-heat the inert gas.

SUMMARY OF THE INVENTION

A hybrid inflator for inflating an airbag system has one or more heater assemblies with an enhancer charge contained in the heater with bypass ports or openings in direct communication with the inert gas. Upon ignition a portion of the enhancer charge bypasses the heater gas generant charge to pre-heat the inert gas prior to or simultaneously with a remaining portion of the enhancer charge igniting the heater gas generant charge.

DETAILED DESCRIPTION OF THE INVENTION

Figure 1:
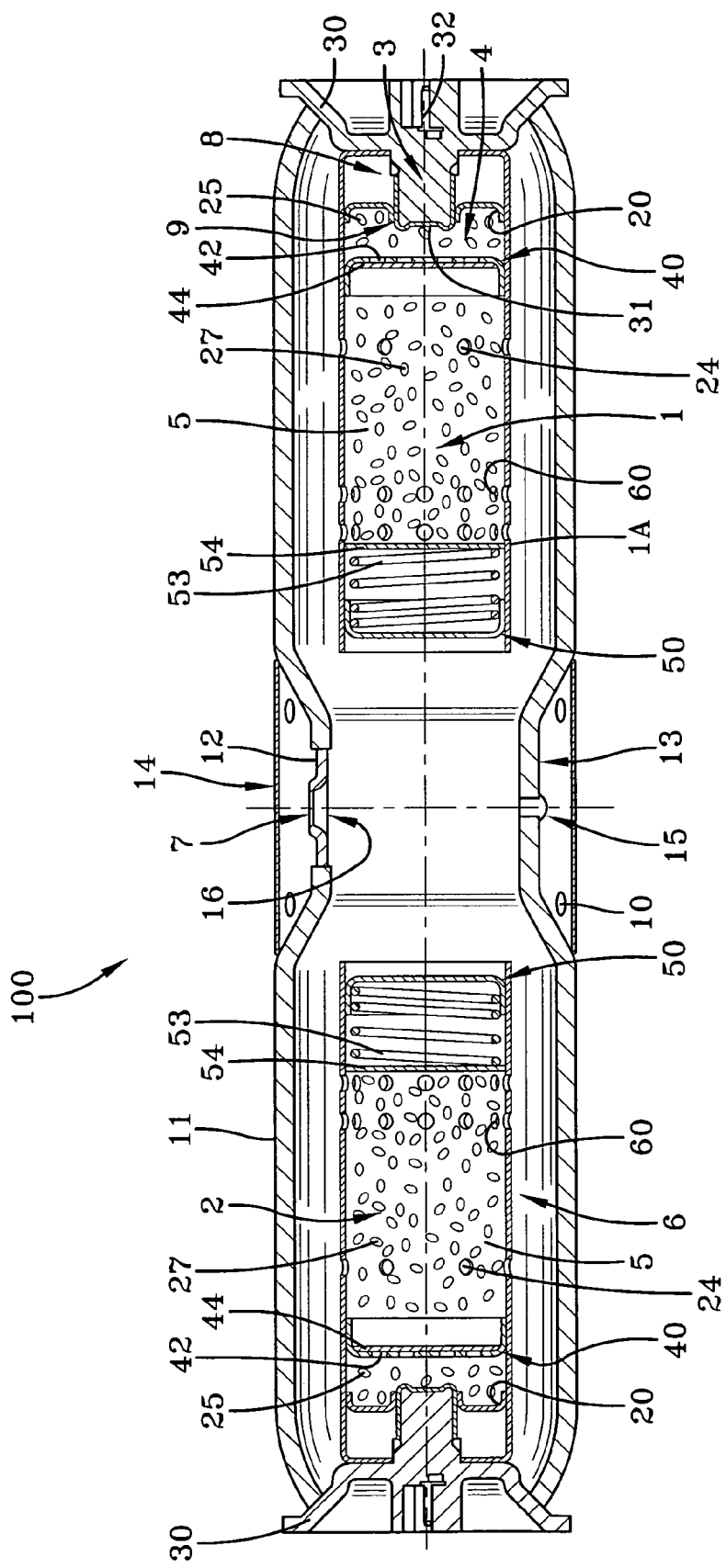
FIG. 1 shows a cross sectional view of a hybrid inflator having two gas heaters internal and connected at each end of the inflator housing according to a first embodiment of the present invention.

With reference to FIG. 1, a dual stage hybrid inflator 100 is shown. The inflator 100 contains a primary stage heater assembly 1 and a second stage heater assembly 2. One or both heaters can utilize the high bypass ignition concept of the present invention. Typical inflators function by actuating the igniter to ignite the ignition enhancer. The enhancer ignites the heater charge which heats the stored gas. The stored gas is preferably an inert gas. Once a sufficient pressure is reached the outlet burst disk ruptures when internal pressure exceeds the disk failure pressure.

The high bypass enhancers of the present invention improve the time required to burst the outlet disk 7 by using a portion of the enhancing material to pre-heat the inert gas 6.

The triggering of the igniter 3 ignites the enhancer charge 25 in the enhancer chamber 4. The hot gases and particulate produced in the enhancer chamber ignite the heater charge 27 located in the heater gas generating chamber 5 and it also has a portion of the hot gasses produced by the enhancer charge 25 enter the inflator housing mixing with stored inert gas 6 directly through bypass openings 24 thereby heating the stored inert gas 6. The communication ports or openings 24 are sized and positioned to promote the flow of gas into the stored inert gas 6. The openings 24 may be positioned at any location along the generant tube 1A, 1B, 1C to control the relative amount of gas bypassing the heater charge to that igniting the heater charge.

As shown the inflator housing 11 is configured to allow attachment of the primary stage heater 1 and the secondary stage heater 2 at opposite ends of the tubular housing 11. The outlet burst disk 7 is attached to a washer shaped carrier 12 and is positioned in the center part of the tubular housing 11. The center of the tubular shaped housing 11 is reduced in diameter to provide a manifold area 13 and is covered by a gas distribution manifold 14 with exhaust ports 10 the reduction in diameter also serves to reduce stresses at the gas fill point 15 and the outlet burst disk flow passage 16.

In the current invention, the problem of adequate space is solved by placing the heaters 1 and 2 at both ends 30 of the inflator 100 and the outlet passage 16 and the fill port 15 in the sidewall near the center of the tubular housing 11. The problem of achieving acceptable time to first gas is solved through the use of a high bypass enhancer system, in this concept a larger than typical ignition enhancer pyrotechnic load or charge 25 can be used. The ignition enhancer 25 burns quickly, in one to three milliseconds. Hot gases produced by the enhancer charge 25 are directed to the heater pyrotechnic charge 27 and a portion of the hot gasses produced by the enhancer charge 25 goes into the gas storage bottle or housing 11 through the bypass openings 24, and in this way the fast acting enhancer materials both heats the stored gas 6 to increase the pressure to the outlet burst disk 7 and also ignites the heater pyrotechnic charge 27. The arrangement avoids the problem of over igniting the heater charge 27 by bypassing a portion of the larger than usual ignition enhancer charge 25 while allowing a portion of the hot gasses produced by the enhancer charge 25 to pass directly through the heater to ignite the heater charge 27.

As shown the hybrid inflator 100 has two heater assemblies 1, 2, each assembly can employ the bypass enhancer system of the present invention or alternatively one heater assembly may employ a high bypass system and the other may be a more conventional heater mechanism not employing the bypass system. Additionally the hybrid inflator 100 can be built with a single heater element heater assembly 1, in such a case the inflator housing 11 may be shortened substantially or the heater assembly 1 can be elongated in such a fashion to increase the amount of enhancer charge 25 and heater charge 27 available for the purposes of preheating and heating the inert gases 6 within the hybrid inflator 100.

Figure 2:
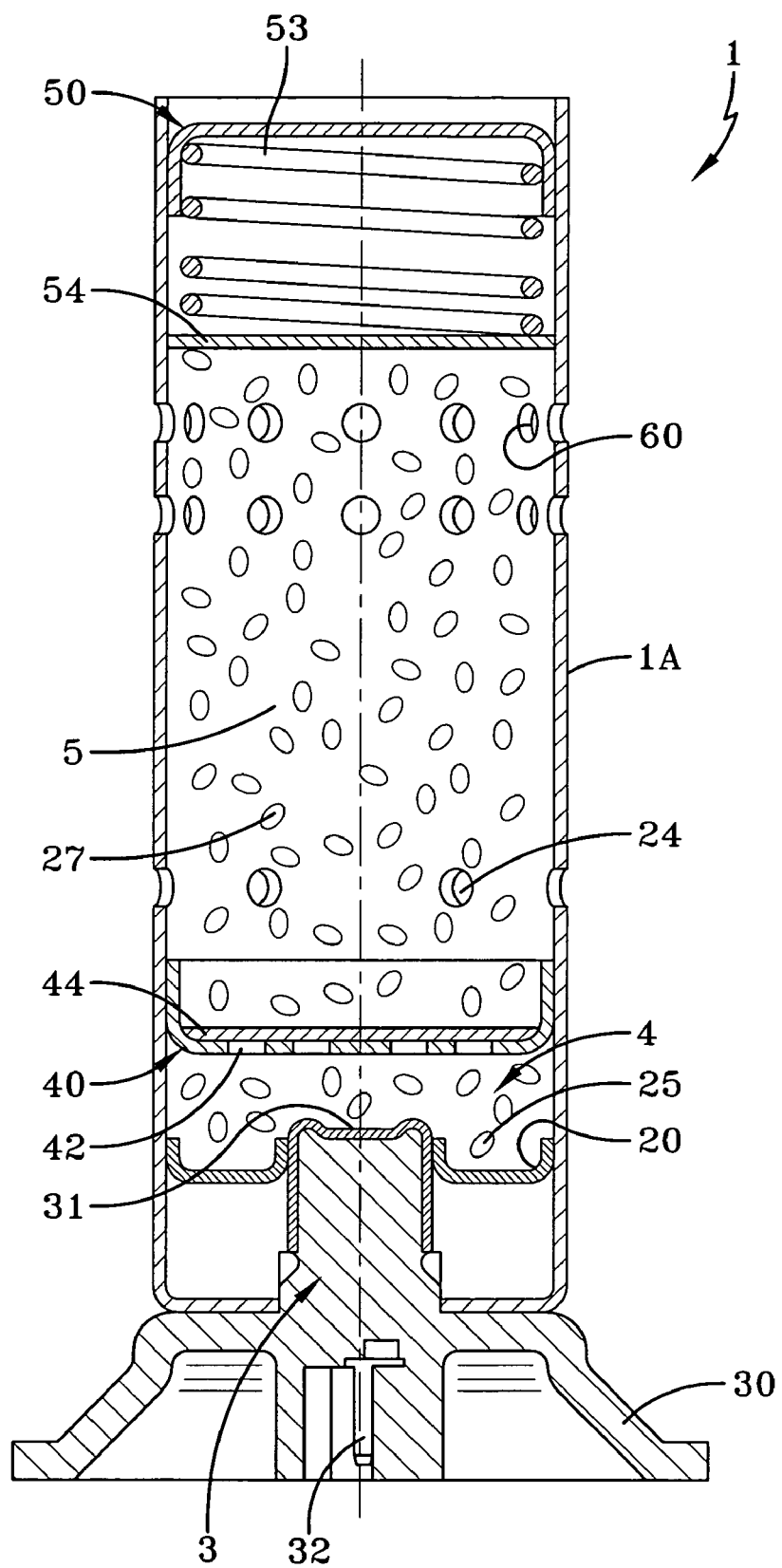
FIG. 2 is a cross sectional view of a heater taken from FIG. 1 and made according to the present invention.
Figure 3:
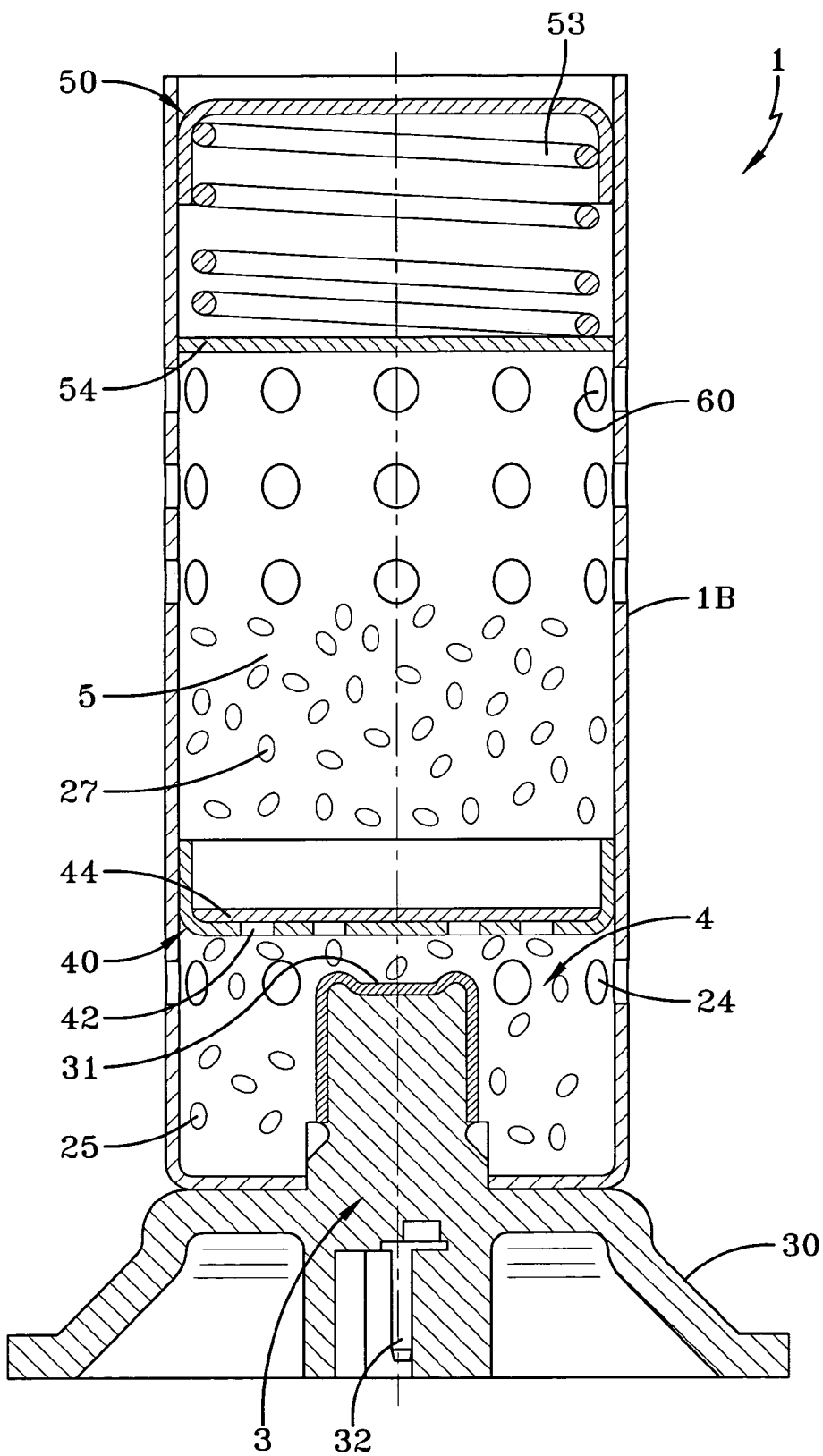
FIG. 3 is a cross sectional view of a second embodiment heater made according to the present invention that is an alternative to the heater employed in FIG. 2.
Figure 4:
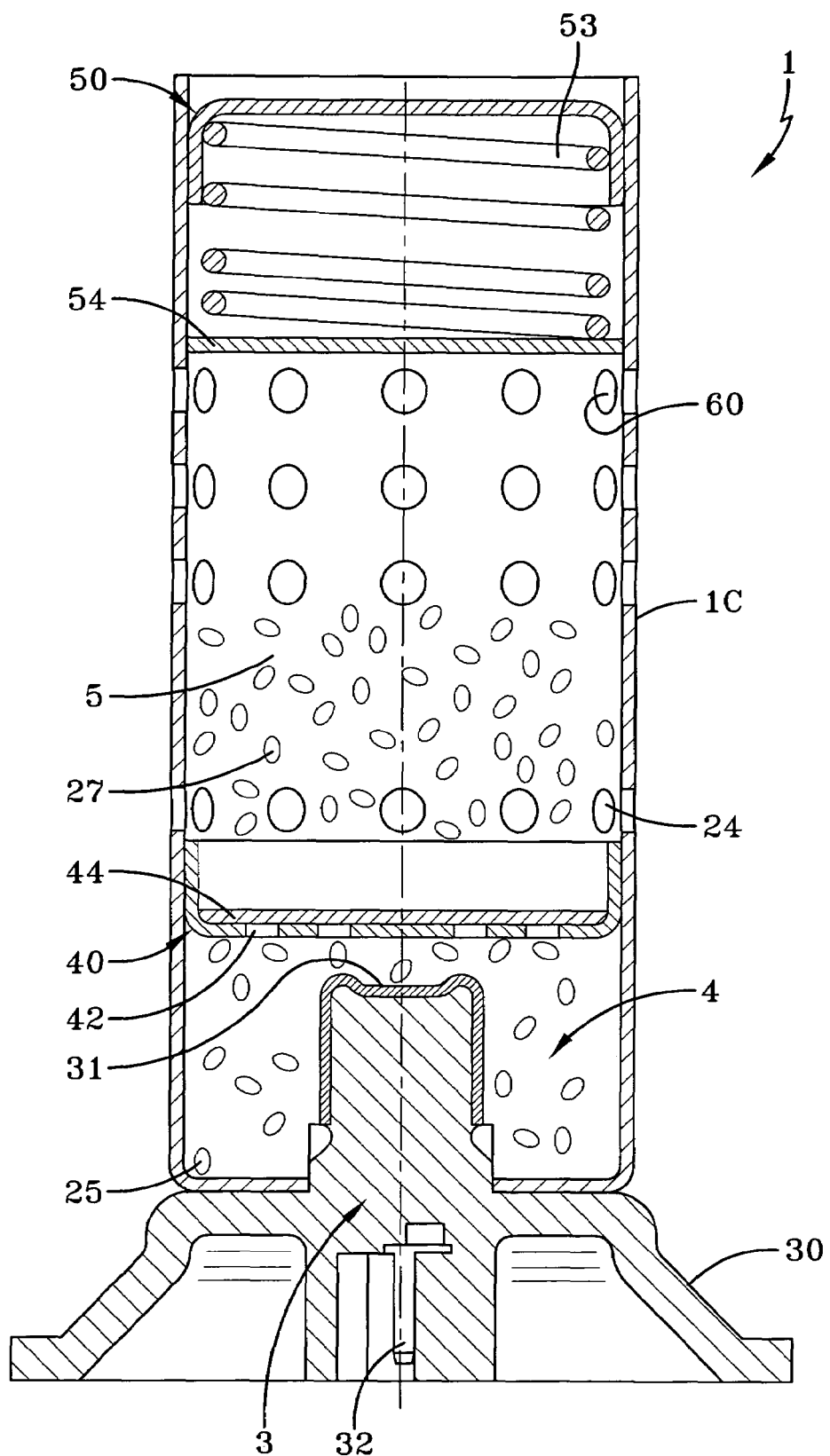
FIG. 4 is a cross sectional view of a third embodiment heater according to another alternative embodiment of the invention. The third heater also being a substitute for the heater as illustrated in FIG. 1.

The following provides a description of several heater assemblies employing the enhancer bypass system according to the present invention. Each of the FIGS. 2, 3 and 4 shows a different heater assembly that can be employed within the inflator housing 11 as illustrated in FIG. 1. It must be understood that the reference numerals for similar components remain similar and those of alternative or substitute components are provided with distinct reference numerals. For ease of understanding the invention the gas generant charge 27 and the enhancer charge 25 are not shown in entirety, but are represented by a few pellets. These charges are generally formed in either a disk type material that can fit within the heater housing or more preferably in pellet size combustion pyrotechnics; these pellet size pyrotechnics are sized sufficiently large to prevent them from passing through any of the openings 24, 60 within the heater assembly. As illustrated the heater assembly is shown is such that in each of the areas where a particular charge is shown we have defined that charge area or volume as a chamber, these chambers it can be assumed are filled or at least partially filled with the pyrotechnic components described herein. One of ordinary skill in the art will appreciate the manner in which pyrotechnics are filled in such heater assemblies; however, they are not completely shown so that the functioning components of the structure of the inflator can be more easily shown.

With reference to FIG. 2, the first heater assembly 1 is illustrated in cross sectional view. The heater assembly 1 has a housing 1A which is physically connected to an end cap 30 of the inflator housing 11. Located within the end cap 30 is an ignition means 3. The ignition means as shown is a squib 3 that is electrically connected at the opening 32 such that the squib 3 can be fired allowing a small explosive charge to burst a covering plate 31 allowing the explosive charge to ignite the enhancer charge 25 contained within the enhancer chamber portion 4. Once the enhancer charge 25 within the chamber portion 4 is ignited portions of that ignited gas and particulates enter into the heater gas generant chamber 5 and a portion of that ignited enhancer 25 bypass out of the heater chamber 5 and pass through openings 24 which enable the ignited gas and particulates to pass directly into the inflator housing 11 and pre-heat the inert gas 6. As shown, ignited gases and particulates from the enhancer chamber portion 4 pass through one or more communication ports or first openings 42 thereby igniting the gas generant charge 27. A portion of the gases from the enhancer chamber portion 4 are burning in such a fashion that they are generating a pressure. Once the pressure is sufficiently large a barrier foil 44 shown adjacent to the bulkhead 40 is burst. When the barrier foil 44 bursts, the one or more first openings 42 in the bulkhead 40 are exposed into the heater chamber or gas generant chamber 5. As these hot gases and particulates enter into the gas generant chamber 5 a portion bypasses through openings 24 and then the gas generant pellets of the heater charge 27 are then ignited shortly thereafter. As these pellets 27 are ignited a portion of the heated gases and particulates from the heater chamber or gas generant chamber 5 pass through the plurality of openings 60 this permits a heating of the inert gas 6 as well.

As shown when these charges 25, 27 are first assembled into the housing unit the end closures retain the enhancer pellets 25 such that the enhancer chamber 4 is positioned by the enhancer spacing bulkhead 20 which separates the empty end chamber portion 8 from the enhancer charged filled enhancer chamber portion 4. This effectively locates the enhancer charge 25 in close proximity to the initiator or squib 3, the heater charge 27 and bulkhead 40. Once the enhancer chamber portion 4 has been filled the bulkhead 40 separating the enhancer chamber 4 from the gas generant chamber 5 is inserted as shown. Then the gas generant pellets 27 can be loaded into the heater assembly 1. The end cap 50 is then pushed into the end of the heater housing 1 compressing a spring 53 and a pellet retaining plate 54 in close contact with the pellet gas generant charge 27.

With reference to FIG. 3, an alternative embodiment is shown wherein a second heater assembly 1 having the heater housing 1B is illustrated. In this embodiment the enhancer chamber 4 is a single enhancer chamber 4 having a plurality of bypass openings 24. The enhancer chamber 4 is filled with an enhancer charge 25 and when the ignition means 3 is fired an enclosure 31 bursts such that the enhancer charge 25 is ignited, as the enhancer charge 25 ignites portions of the enhancer charge 25 ignited gases and particulates are released through the bypass openings 24 and pre-heat the inert gas 6. As the pressure rises the burst disk 44 at the bulkhead 40 ruptures. As the seal is opened hot gases and particulates pass through the one or more first openings 42 and pass into the generant chamber 5 heating the generant charge 27 such that it ignites. As it ignites portions of the hot gases and particulates of the generant charge 27 pass through a plurality of openings 60. As shown the openings 60 are provided around the peripheral surface of the housing 1B and as shown openings 60 are provided in three to five rows. These openings 60 permit the hot gases and particulates to escape or at least partially escape also pre-heating the inert gas 6. When a sufficient pressure is reached to permit the rupture disk 7 shown in FIG. 1 to burst thereby filling the manifold area 15 in such a fashion that the hot gases can escape thereby filling the airbag for deployment. Optionally the enhancer chamber 4 of the alternative embodiment can also include an enhancer spacing bulkhead 20 (FIG. 1) if so desired.

With reference to FIG. 4, a third embodiment of the invention is shown. This embodiment is very similar to the first embodiment and the heater assembly 1 has a housing 1C the housing 1C also contains a generant chamber 5 for containing the gas generant 27 and an enhancer chamber 4 for holding an enhancer charge 25. Again when the ignition squib 3 is activated the covering 31 ruptures and hot charges ignite the enhancer charge 25. As the pressure rises a burst disk 44 attached to the bulkhead 40 bursts allowing the ignited enhancer gases and particulates to pass through the one or more first openings 42. As these gases pass through the one or more first openings 42 they are permitted to pass through the plurality of openings 24 in close proximity to and adjacent to the bulkhead 40. These bypass openings 24 permit a portion of the enhancer gases and hot particulates to pass into the inert gas 6 and pre-heat the inert gas 6. As the remaining portion of enhancer charge 25 gases pass through the generant pellets 27 while an initial portion of the hot gases and particulates pass through the bypass openings 24, the remaining portion continues to push into the gas generant chamber 5 thereby igniting the gas generant charge 27. As the gas generant charge 27 is ignited all or large portions of that charge 27 are permitted to pass through the openings 60 as shown. Enabling the inflator to reach full pressure prior to rupturing the disk 7 and allowing the airbag to deploy. Unlike the first embodiment of FIGS. 1 and 2, this third embodiment does not have an enhancer spacing bulkhead 20 and thus the entire chamber 4 is available to hold the enhancer charge 25.

As shown in FIGS. 1, 2 and 4, the openings 24 are sufficiently large and in close enough proximity to permit the enhancer charge 25 ignited gases and particulates to expel through them while a remaining portion of the enhancer charge 25 gases and particulates are used to ignite the generant charge 27. This can be accomplished by first providing the row of openings 24 in very close proximity to the one or more first openings 42 and sufficiently spacing them from the openings 60 such that a sufficient amount of gases and particulates are free to bypass through the openings 24 prior to a remaining portion moving through the generant chamber 5 igniting the gas generant 27, as the gas generant 27 is ignited the openings 60 come into play, allowing some of those gases and particulates if not all to expel into the inert gas 6 also providing a form of pre-heating prior permitting the gases to expel from the openings 60 and 24 during the entire process.

As can be seen each of the embodiments shown in FIGS. 2, 3 and 4 provide an efficient means to permit a portion of the enhancer hot gases and particulates to bypass and pre-heat the inert gas 6. Each of the systems is activated by the use a single igniter squib 3. This has the benefits of both simplifying the heater assembly 1 or 2 and the mechanisms, but also simplifying the ignition process such that it is more reliable.

In each of the embodiments illustrated it should be noted that the openings 24 in either the enhancer chamber 4 or the heater gas generant chamber 5, in other words openings 24 and 60 are in direct communication with the inert gas 6. Accordingly the inert gas 6 can pass through and is in direct communication with either the enhancer charge 25 and the gas generant charge 27 as shown in FIG. 3 or the heater gas generant charge 27 in all the heater assemblies 1. In FIGS. 1, 2 and 4 using housing 1A or 1C the enhancer charge 25 is not in direct communication with the inert gas 6 as illustrated.

To summarize, the hybrid inflator 100 for inflating an airbag system as shown in FIGS. 1 and 2 has an inflator housing 11 filled with pressurized medium containing an inert gas 6 and one or more heaters 1, 2 internal and connected at an end of the inflator housing 11. At least one of the gas heaters 1 or 2 has an outer shell formed by the heater housing having a plurality of heater holes 60, a gas generating chamber 5 in which a generant charge 27 is stored, the gas generating chamber 5 and the inflator housing 11 being in communication with each other through the plurality of holes 60, an ignition means 3 connected to the gas heater 3 and located at an end of the inflator housing 11, and an enhancer chamber 4, in which an enhancer charge is stored. The enhancer chamber 4 is located between the gas generating chamber 5 and the ignition means 3 and is separated from the gas generating chamber 5 by a bulkhead 40. The bulkhead 40 has one or more first openings 42 leading to the gas generating chamber 5.

In the first embodiment of the invention, an enhancer spacing bulkhead 20 is employed dividing the enhancer chamber 4 into a first chamber portion 4 of a volume or size appropriate for the enhancer charge 25 and a second empty chamber portion 8 occupying the end space. This bulkhead 20 is somewhat washer shaped and encircles the squib or ignition means 3.

An alternative second embodiment shown in FIG. 3 has a single enhancer chamber 4 wherein an enhancer charge 25 is stored. In this embodiment, when the enhancer charge 25 is ignited by an ignition means 3 it passes hot gases and particulates through a plurality of enhancer chamber bypass openings 24 directly to the inflator housing 11 thereby pre-heating the inert gas 6 in the inflator housing 11 and the enhancer chamber 4 passes ignited enhancer charged gases through the one or more first openings 42 in the bulkhead 40 and ignites the heater charge 27.

In the third embodiment shown in FIG. 4, the enhancer charge 25 is stored in a single enhancer chamber 4 that when ignited passes the ignited enhancer gases through the bulkheads 40 one or more first openings 42 and in close proximity to the bulkhead 40 are a plurality of bypass openings 24 that permit a portion of the enhancer gases and particulates to escape directly into the inert gas chamber 6 of the inflator housing 11 thereby pre-heating the inert chamber 6 while the remaining portion of the ignited hot gases and particulates continues into the gas generating chamber 5 to ignite the gas generant charge 27. In each case only a single ignition means 3 is connected to each gas heater and is used to start the entire gas initiation ignition as described above.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hybrid inflator for inflating an airbag system of a vehicle, comprising:

an inflator housing having a pair of opposite ends, the inflator housing being filled with a pressurized medium containing an inert gas;

one or more gas heaters inside the inflator housing and one gas heater being connected at an end of at least one of the pair of opposite ends of the inflator housing, at least one of the one or more gas heaters including;

an outer shell formed by a heater housing having a plurality of heater holes and a plurality of bypass openings;

a gas generating chamber in which a gas generant charge is stored, the gas generating chamber and the inflator housing being in communication with each other through the plurality of heater holes and the plurality of bypass openings;

an ignition means connected to at least one of the one or more gas heaters connected at an end of the inflator housing and being located at an end of the inflator housing;

an enhancer chamber in which an enhancer charge is stored, the enhancer chamber being located between the gas generating chamber in which the gas generant charge is stored and the ignition means, and separated from the gas generating chamber by a bulkhead, the bulkhead having one or more first openings to the gas generator chamber, and being located in close proximity to the plurality of bypass openings; and a rupture disk attached to and covering the one or more first openings in the bulkhead;

wherein the enhancer charge when ignited by the ignition means increases the pressure in the enhancer chamber causing the rupture disk to burst after a predetermined pressure is reached within the enhancer chamber, passes ignited gases through the one or more first openings in the bulkhead and passes a portion of the ignited gases of the enhancer charge through the bypass openings in proximity to the bulkhead pre-heating the inert gas in the inflator and a remaining portion of the ignited enhancer charge ignites the gas generant charge stored in the gas generating chamber.

2. The hybrid inflator of claim 1 wherein the inflator housing has a second end and the inflator has two gas heaters with one gas heater at each end of the inflator housing.

3. The hybrid inflator of claim 2 wherein the inflator housing is tubular shaped having a reduced diameter central portion.

4. The hybrid inflator of claim 3 wherein the central portion has a gas outlet opening, the outlet opening being sealed by an outlet burst disk.

5. The hybrid inflator of claim 3 wherein the central portion has a gas fill port, the gas fill port being sealed.

6. The hybrid inflator of claim 3 wherein the reduced diameter central portion is covered by a cylindrical gas distribution manifold to form a manifold area, the distribution manifold includes a plurality of holes.

7. A hybrid inflator for inflating an airbag system of a vehicle, comprising:
   an inflator housing having a pair of opposite ends, the inflator housing being filled with a pressurized medium containing an inert gas;
   one or more gas heaters internal of the heater housing and one gas heater being connected at an end of at least one of the pair of opposite ends of the inflator housing, at least one of the one or more gas heaters including;
   an outer shell formed by a heater housing having a plurality of heater holes;
   a gas generating chamber in which a gas generant charge is stored, the gas generating chamber and the inflator housing being in communication with each other through the plurality of heater holes;
   an ignition means connected to the at least one of the one or more gas heaters connected at an end of the inflator housing and being located at an end of the inflator housing;
   an enhancer chamber in which an enhancer charge is stored, the enhancer chamber being located between the gas generating chamber in which the gas generant charge is stored and the ignition means, and separated from the gas generating chamber by a bulkhead, the bulkhead having one or more first openings to the gas generator chamber, and the enhancer chamber having one or more bypass openings to the inflator housing; and
   a rupture disk attached to and covering the one or more first openings in the bulkhead;
   wherein the enhancer charge when ignited by the ignition means passes ignited gases of the enhancer charge through the enhancer chamber bypass openings to the inflator housing thereby pre-heating the inert gas in the inflator housing, after a predetermined pressure is reached within the enhancer chamber upon ignition of the enhancer charge, the rupture disk bursts and the enhancer chamber passes ignited enhancer charge gases through the one or more first openings in the bulkhead and ignites the gas generant charge stored in the gas generating chamber.

8. The hybrid inflator of claim 7 wherein the inflator housing has a second end and the inflator has two gas heaters with one gas heater at each end of the inflator housing.

9. The hybrid inflator of claim 8 wherein the inflator housing is tubular shaped having a reduced diameter central portion.

10. The hybrid inflator of claim 9 wherein the central portion has a gas outlet opening, the outlet opening being sealed by an outlet burst disk.

11. The hybrid inflator of claim 9 wherein the central portion has a gas fill port, the gas fill port being sealed.

12. The hybrid inflator of claim 9 wherein the reduced diameter central portion to provide a manifold area that is covered by a cylindrical gas distribution manifold to form a manifold area, the distribution manifold includes a plurality of holes around the circumference.

* * * * *